United States Patent
Chae et al.

(10) Patent No.: US 7,365,820 B2
(45) Date of Patent: Apr. 29, 2008

(54) IN-PLANE SWITCHING MODE LIQUID CRYSTAL DISPLAY DEVICE AND METHOD OF FABRICATING THE SAME

(75) Inventors: Gee Sung Chae, Incheon-si (KR); Yun Bok Lee, Seoul (KR)

(73) Assignee: LG.Philips LCD Co., Ltd., Seoul (KR)

(*) Notice: Subject to any disclaimer, the term of this patent is extended or adjusted under 35 U.S.C. 154(b) by 337 days.

(21) Appl. No.: 10/878,535

(22) Filed: Jun. 29, 2004

(65) Prior Publication Data

US 2005/0140896 A1 Jun. 30, 2005

(30) Foreign Application Priority Data

Dec. 29, 2003 (KR) .................... 10-2003-0098614

(51) Int. Cl.
*G02F 1/1343* (2006.01)
(52) U.S. Cl. .................................... 349/141
(58) Field of Classification Search ............... 349/141; 257/59, 72

See application file for complete search history.

(56) References Cited

U.S. PATENT DOCUMENTS 6,243,154 B1* 6/2001 You et al. .................. 349/141
2005/0128407 A1* 6/2005 Lee et al. ................... 349/141
2005/0128408 A1* 6/2005 Lee ............................. 349/141

* cited by examiner

*Primary Examiner*—James A. Dudek
(74) *Attorney, Agent, or Firm*—Morgan, Lewis & Bockius LLP

(57) ABSTRACT

A liquid crystal display device includes first and second common electrode lines on a substrate extending along a first direction, a pair of adjacent data lines extending along a second direction perpendicular to the first direction to cross the first and second common electrode lines to define a unit pixel region, a gate line extending between the first and second common electrode lines along the first direction and crossing the pair of adjacent data lines, the first and second common electrode lines spaced apart from the gate line by a first distance along the second direction defining a first pixel region and a second pixel region of the unit pixel region, and a thin film transistor formed at the crossing of the gate line and one of the pair of adjacent data lines, the thin film transistor including a pair of drain electrodes, a source electrode, and a portion of the gate line, wherein each of the first and second pixel regions includes a circular pixel electrode and first and second circular common electrodes.

23 Claims, 11 Drawing Sheets

IN-PLANE SWITCHING MODE LIQUID CRYSTAL DISPLAY DEVICE AND METHOD OF FABRICATING THE SAME

The present invention claims the benefit of Korean Patent Application No. 98614/2003 filed in Korea on Dec. 29, 2003, which is hereby incorporated by reference.

BACKGROUND OF THE INVENTION

1. Field of the Invention

The present invention relates to a liquid crystal display (LCD) device and a method of fabricating an LCD device, and more particularly, to an In-Plane Switching (IPS) mode LCD device and a method of fabricating an IPS mode LCD device.

2. Description of the Related Art

In general, an LCD device is formed by attaching an upper substrate and a lower substrate and injecting a liquid crystal into a space between the upper substrate and the lower substrate. In addition, a polarizer and a retardation film are attached on outer surfaces of the upper substrate and the lower substrate. Accordingly, by selectively arranging functional elements of the LCD device, an advancing direction or refractive index of light is changed, thereby forming an LCD device having high brightness and contrast characteristics.

A liquid crystal cell used in an LCD device may employ a twisted nematic (TN) operational mode. In the TN mode, light transmittance for displaying a gray scale is varied depending on a viewing angle, thereby limiting fabrication of large-sized LCD devices. To overcome the problem, an In-Plane-Switching (IPS) mode LCD device has been developed that uses a horizontal electric field, thereby improving viewing angle characteristics, such as a contrast, a gray inversion, and a color shift, as compared with the TN mode LCD device.

The IPS mode LCD device includes a pixel electrode and a common electrode formed on a common plane of a thin film transistor (TFT) array substrate, i.e., a lower substrate provided with a plurality of TFTs formed thereon. Accordingly, liquid crystal material is driven by the horizontal electric field formed by the coplanar pixel and common electrodes.

FIG. 1 is a plan view of an IPS mode LCD device according to the related art. In FIG. 1, an IPS mode LCD device includes a plurality of gate lines 111 and a plurality of data lines 113 crossing the gate lines 111 on a lower substrate. In addition, a TFT T is arranged at a cross point of the gate and data lines 111 and 113, wherein the TFT T includes a gate electrode 119, a source electrode 121, and a drain electrode 123.

A common electrode 115 and a pixel electrode 117 are disposed engaged with each other in a finger-type configuration on a unit pixel region defined by the gate and data lines 111 and 113. The finger-type common electrode 115 includes a first common electrode 115a having a plurality of vertical patterns and a second common electrode 115b that is a horizontal pattern for combining the plurality of vertical patterns as a single body. The finger-type common electrode 115 is spaced apart by a predetermined distance from the gate line 111. In addition, the finger-type pixel electrode 117 includes a first pixel electrode 117a having a plurality of vertical patterns and a second pixel electrode 117b that is a horizontal pattern for combining the plurality of vertical patterns as a single body. Both end branches of the first common electrode 115a formed within a unit pixel region overlap the data lines 113 on the data lines 113, thereby increasing an aperture ratio of the IPS mode LCD device.

FIGS. 2A to 2C are cross sectional views along I-I' and II-II' of FIG. 1 of a method of fabricating an IPS mode LCD device according to the related art. In FIGS. 2A to 2C, each pattern is formed by transferring a pattern of a mask on a substrate having a thin film formed thereon using a photolithographic process, which includes photoresist coating, align exposure, and developing.

In FIG. 2A, a conductive metal film is deposited onto a substrate 109, and then patterned to form a gate line 111 (in FIG. 1) and a gate electrode 119. Next, a gate insulating layer 118 is formed along an entire surface of the substrate 109 including the gate line 111 by depositing an inorganic insulator film, such as $SiN_x$ or $SiO_2$, or an organic insulator film, such as acryl resin or benzocyclobutene (BCB).

In FIG. 2B, a pure amorphous silicon (a-Si) and an impurity-doped amorphous silicon (n+a-Si) are sequentially deposited onto the substrate 109 including the gate insulating layer 118, and then patterned to form an active layer 125 and an ohmic contact layer 127. Next, a conductive metal film is deposited onto the substrate 109 including the ohmic contact layer 127, and then patterned to form a data line 113, a source electrode 121, and a drain electrode 123. Then, a low dielectric material, such as BCB or an acryl resin, is deposited along an entire surface of the substrate 109 including the drain electrode 123, the source electrode 121, and the data line 113, and then patterned to form a drain contact hole 131 on the drain electrode 123.

In FIG. 2C, a transparent conductive metal film, such as indium-tin-oxide (ITO) or indium-zinc-oxide (IZO), is deposited and then patterned to form a finger-type common electrode 115 and a finger-type pixel electrode 117, which are spaced apart by a predetermined distance from each other and are engaged with each other. In FIG. 2C, vertical patterns 115a of the common electrode 115 and vertical patterns 117a of the pixel electrode 116 are shown.

However, since the substrate 109 is generally larger than a-size of the exposure mask used during the photolithographic process, the entire area of the substrate 109 is divided into a plurality of regions and is repeatedly exposed to light by a plurality of exposures by an exposure apparatus. Accordingly, misalignment between sequential exposures (i.e., stitch failure) occurs due to accuracy limits of the exposure apparatus, thereby deteriorating image quality of the IPS mode LCD device. Thus, the masks used to form the IPS mode LCD device become slightly distorted, thereby causing an overlay failure in which the gate electrode and the source/drain electrode are inaccurately overlapped on each of the pixel regions and deteriorating image quality of the IPS mode LCD device.

In addition, although the IPS mode LCD device shows improved viewing angle characteristics, such as a color shift, as compared with the TN mode LCD device, the IPS mode LCD device but does not maintain a uniform viewing angle with respect to all directions and cannot overcome the color shift problem.

SUMMARY OF THE INVENTION

Accordingly, the present invention is directed to an IPS mode LCD device and a method of fabricating an IPS mode LCD device that substantially obviate one or more problems due to limitations and disadvantages of the related art.

An object of the present invention is to provide an IPS mode LCD device having a uniform viewing angle.

Another object of the present invention is to provide a method of fabricating an IPS mode LCD device having a uniform viewing angle.

Another object of the present invention is to provide an IPS mode LCD device for preventing color shift.

Another object of the present invention is to provide a method of fabricating an IPS mode LCD device for preventing color shift.

Another object of the present invention is to provide an IPS mode LCD device having uniform image quality.

Another object of the present invention is to provide a method of fabricating an IPS mode LCD device having uniform image quality.

Another object of the present invention is to provide an IPS mode LCD device for preventing misalignment during sequential fabrication processes.

Another object of the present invention is to provide a method of fabricating an IPS mode LCD device for preventing misalignment during sequential fabrication processes.

Additional features and advantages of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described, an In-Plane Switching mode liquid crystal display device includes a unit pixel region bordered by first and second common electrode lines extending along a first direction, and bordered by a pair of adjacent data lines extending along a second direction perpendicular to the first direction, a gate line extending through a middle region of the unit pixel region to define first and second pixel regions, the first and second common electrode lines spaced apart from the gate line by a first distance along the second direction, and the gate line crossing the pair of adjacent data lines at first and second edges of the middle region of the unit pixel region, a thin film transistor formed at the first edge of the middle region of the unit pixel region, the thin film transistor including a pair of drain electrodes, a source electrode, and a gate electrode, first and second circular pixel electrodes each electrically connected with one of the pair of drain electrodes, the first circular pixel electrode disposed within the first pixel region of the unit pixel region and the second circular pixel electrode disposed within the second pixel region of the unit pixel region, first and second circular common electrodes connected to the first common line and disposed within the first pixel region, the first circular common electrode disposed at an interior center region of the first circular pixel electrode and the second circular common electrode disposed at an exterior lateral portion of the first circular pixel electrode, and third and fourth circular common electrodes connected to the second common line and disposed within the second pixel region, the third circular common electrode disposed at an interior center region of the second circular pixel electrode and the fourth circular common electrode disposed at an exterior lateral portion of the second circular pixel electrode.

In another aspect, a method of fabricating an In-Plane Switching mode liquid crystal display device includes forming a gate line and a pair of common electrode lines onto a substrate extending along a first direction, each of the pair of common electrode lines having a vertical pattern extending along a second direction perpendicular to the first direction, forming a gate insulating film on the substrate including the gate line and the pair of common electrode lines, forming a thin film transistor on the gate insulating film, forming a data line extending along the second direction on the gate insulating film, the data line crossing the pair of common electrode lines and the gate line to define a first pixel region between a first one of the pair of common electrode lines and the gate line and to define a second pixel region between a second one of the pair of common electrode lines and the gate line, forming a passivation layer on the substrate including the data line and the thin film transistor, and forming a first circular pixel electrode and a first pair of circular common electrodes within the first pixel region and forming a second circular pixel electrode and a second pair of circular common electrodes within the second pixel region.

In another aspect, a liquid crystal display device includes first and second common electrode lines on a substrate extending along a first direction, a pair of adjacent data lines extending along a second direction perpendicular to the first direction to cross the first and second common electrode lines to define a unit pixel region, a gate line extending between the first and second common electrode lines along the first direction and crossing the pair of adjacent data lines, the first and second common electrode lines spaced apart from the gate line by a first distance along the second direction defining a first pixel region and a second pixel region of the unit pixel region, and a thin film transistor formed at the crossing of the gate line and one of the pair of adjacent data lines, the thin film transistor including a pair of drain electrodes, a source electrode, and a portion of the gate line, wherein each of the first and second pixel regions includes a circular pixel electrode and first and second circular common electrodes.

In another aspect, a method of fabricating a liquid crystal display device includes forming first and second common electrode lines on a substrate extending along a first direction, forming a pair of adjacent data lines extending along a second direction perpendicular to the first direction to cross the first and second common electrode lines to define a unit pixel region, forming a gate line extending between the first and second common electrode lines along the first direction to cross the pair of adjacent data lines, the first and second common electrode lines spaced apart from the gate line by a first distance along the second direction defining a first pixel region and a second pixel region of the unit pixel region, forming a thin film transistor formed at the crossing of the gate line and one of the pair of adjacent data lines, the thin film transistor including a pair of drain electrodes, a source electrode, and a portion of the gate line, and forming a circular pixel electrode and first and second circular common electrodes in each of the first and second pixel regions.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
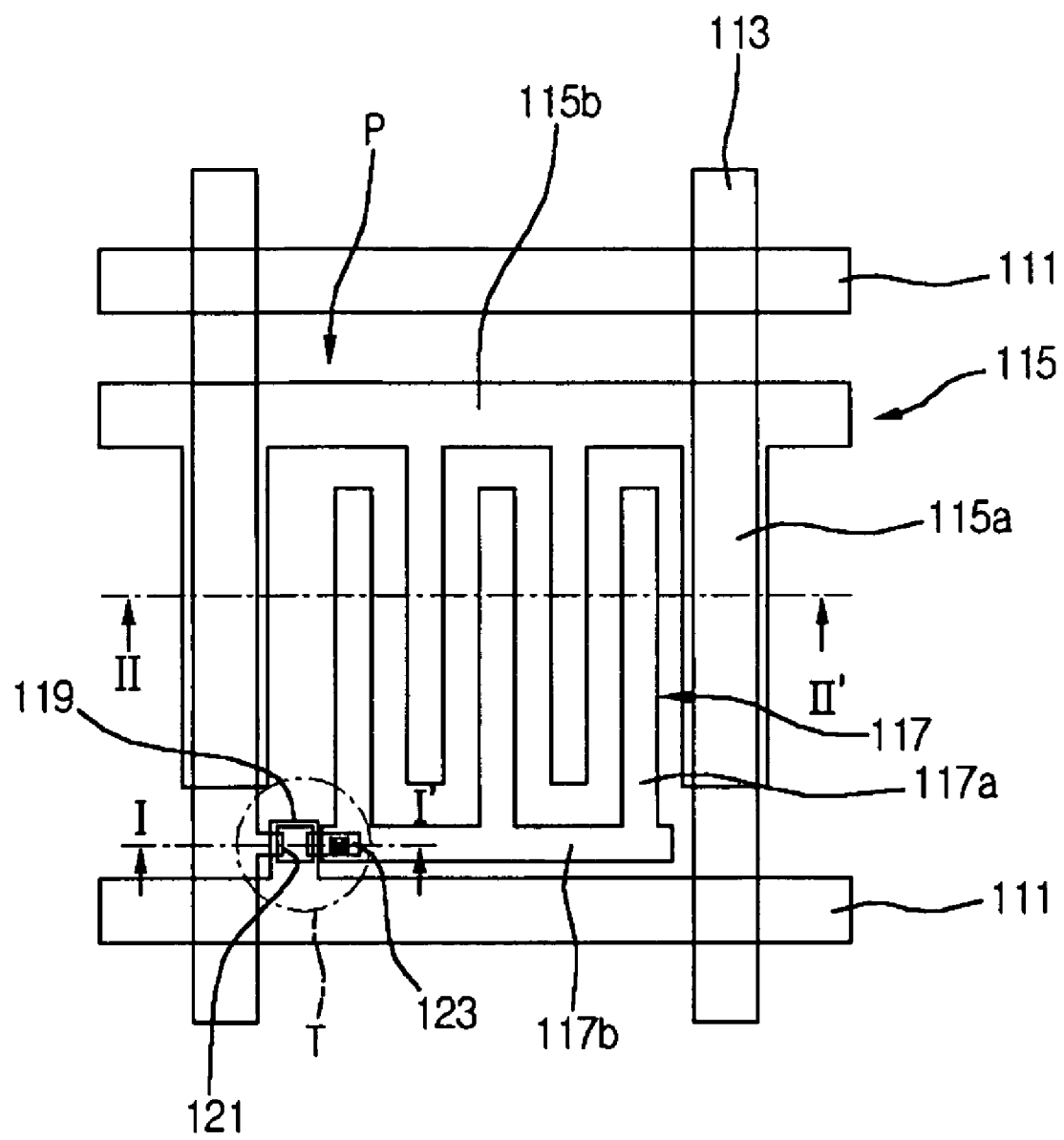
FIG. 1 is a plan view of an IPS mode LCD device according to the related art.
Figure 2A:
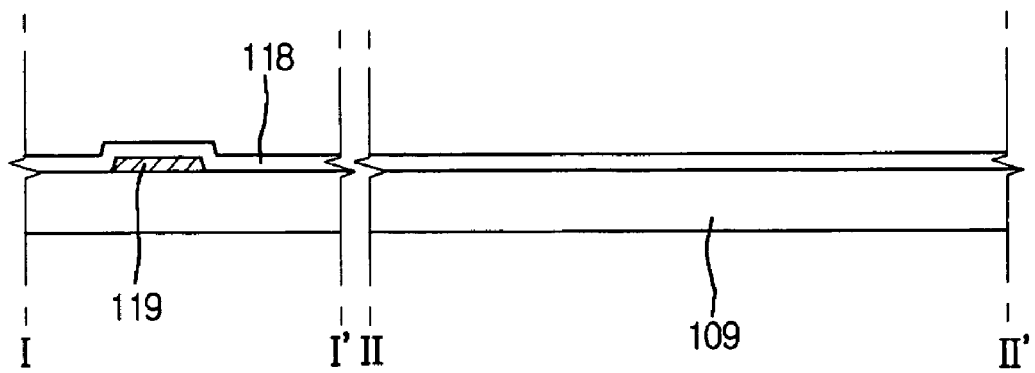
FIGS. 2A to 2C are cross sectional views along I-I' and II-II' of FIG. 1 of a method of fabricating an IPS mode LCD device according to the related art.
Figure 2B:
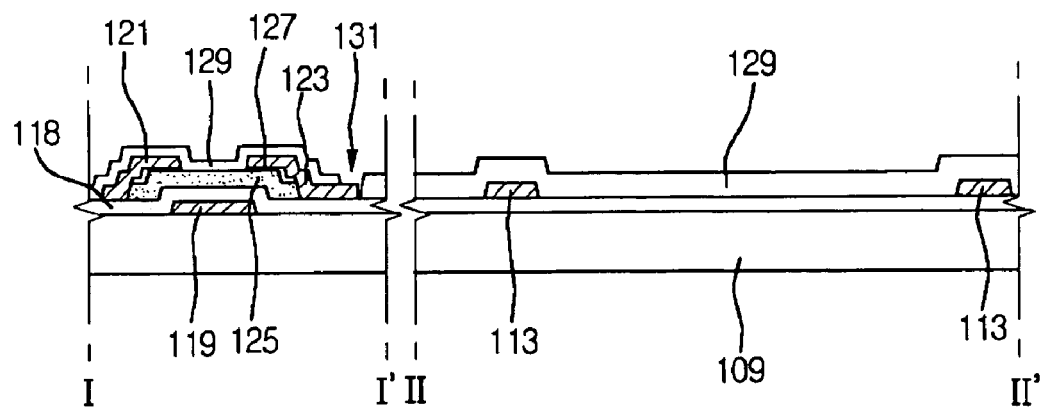
Figure 2C:
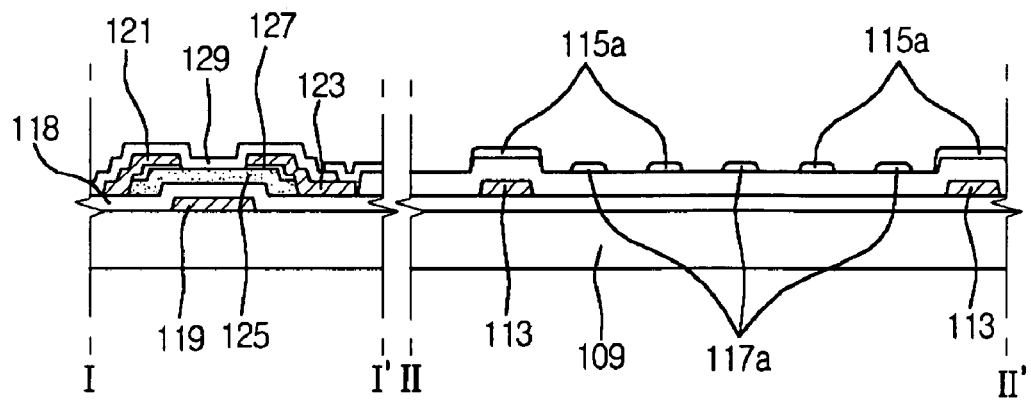
Figure 3:
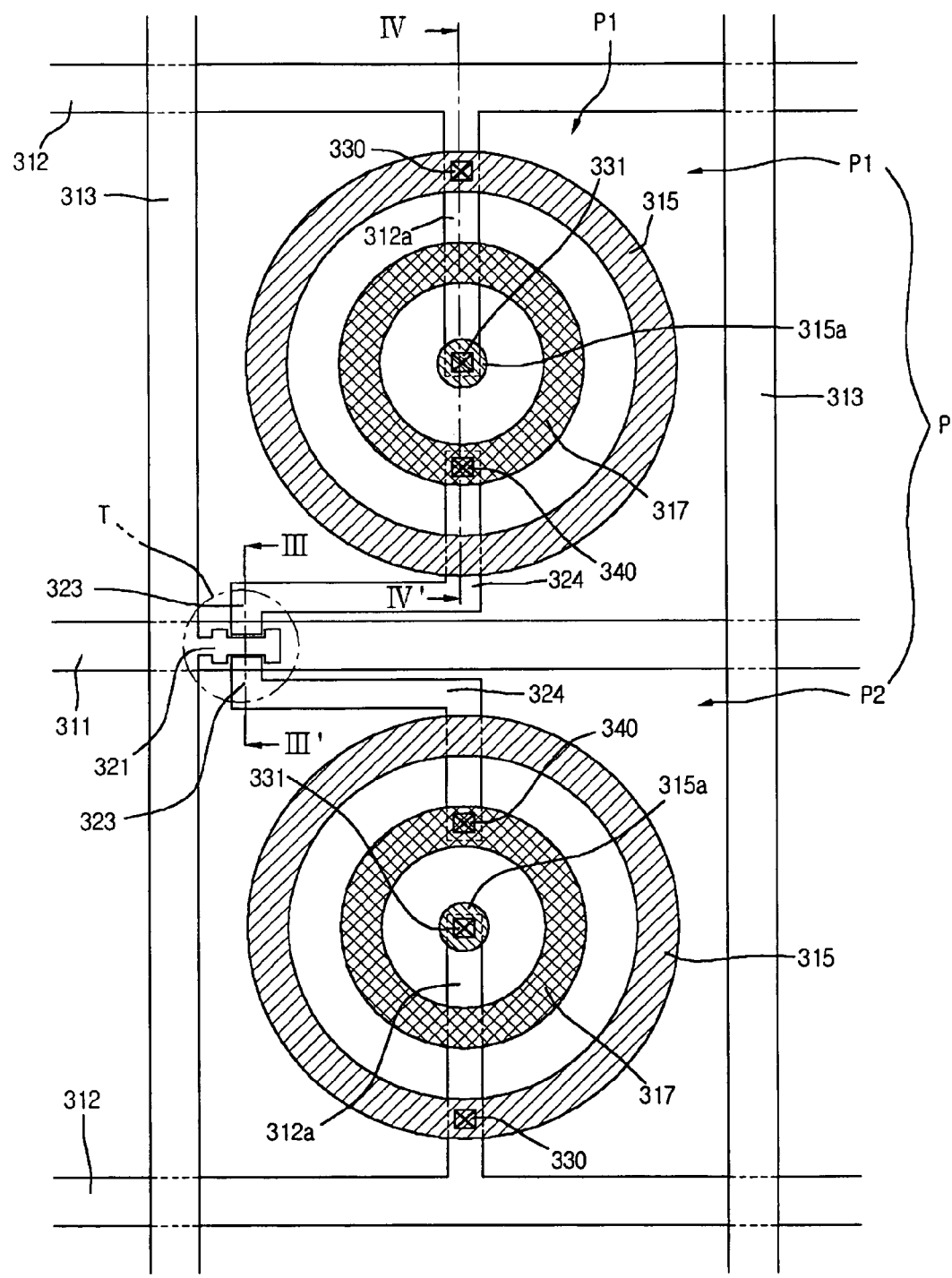
FIG. 3 is a partial plan view of an exemplary lower substrate of an IPS mode LCD device according to the present invention.

FIG. 3 is a partial plan view of an exemplary lower substrate of an IPS mode LCD device according to the present invention. In FIG. 3, a unit pixel P of an IPS mode LCD device may be bordered by a pair of adjacent data lines 313 extending along a first direction and may include a gate line 311 extending along a second direction perpendicular to the first direction, wherein the data lines 313 may cross the gate lines 311. In addition, common electrode lines 312 may be provided to be spaced apart by a distance from the gate line 311 along the first direction. Accordingly, the unit pixel P may include a pair of first and second pixel regions P1 and P2.

The gate line 311 may extend through a middle portion of the unit pixel P, wherein the first pixel region P1 may be formed between the gate line 311 and a first line of the common electrodes 312, and the second pixel region P2 may be formed between the gate line 311 and a second line of the common electrodes 312. Thus, since the first and second pixel regions P1 and P2 may be driven by the same gate and data signals, the first and second pixel regions P1 and P2 may form a single unit pixel region P.

In FIG. 3, a TFT T may be formed at a crossing point of the gate and data lines 311 and 313, wherein the TFT T may be disposed within a middle edge portion of the unit pixel P. Accordingly, the gate line 311 may function as a gate electrode, and a source electrode 321 may extend from the data line 313 along the second direction. Thus, the source electrode 321 may be disposed above the gate line 311, and a pair of drain electrodes 323 may be formed along the first direction adjacent to the source electrode 321. For example, the source electrode 321 may be symmetrically disposed above the gate line 311, wherein centerlines of the source electrode 321 and the gate line 311 may be coincident. Alternatively, the centerlines of the source electrode 321 and the gate line 311 may not be coincident.

Each of the drain electrodes 323 may be connected to a circular pixel electrode 317 via a pixel electrode connection pattern 324 and a contact hole 340. For example, a first one of the drain electrodes 323 may be connected to the circular pixel electrode 317 disposed within the first pixel region P1, and a second one of the drain electrodes 323 may be connected to the circular pixel electrode 317 disposed within the second pixel region P2.

In FIG. 3, a pair of circular common electrodes 315 and 315a may be adjacently provided at interior and exterior portions of each of the circular pixel electrodes 317 provided in the first and second pixel regions P1 and P2. Accordingly, each of the circular common electrodes 315 and 315a may be electrically connected to each other via a common electrode line portion 312a through first and second contact holes 330 and 331, respectively, within each of the first and second pixel regions P1 and P2.

According to the present invention, since the pixel electrodes 317 and the common electrodes 315 and 315a are concentrically positioned having circular shapes, liquid crystal molecules may be driven along radial directions emanating from a first one of the circular common electrodes 315a that may function as a center region. Thus, viewing angle characteristics may be improved, thereby preventing a color shift.

According to the present invention, when a driving signal is applied to the gate line 311 and the TFT T is turned ON, a data voltage supplied through the source electrode 321 may be supplied to each of the pair of pixel electrodes 317 within the first and second pixel regions P1 and P2 via each of the drain electrode 323. In addition, since a constant level voltage may be supplied to the common electrode lines 312 and the circular common electrodes 315 and 315a are connected to the common electrode lines 313 through the common electrode line portions 312a, a horizontal electric field may be supplied between the common electrodes 315 and 315a and the pixel electrode 315 with each of the first and second pixel regions P1 and P2.

In addition, as shown in FIG. 3, by forming the TFT T at a crossing point of the gate and data lines 311 and 313 within a middle edge portion of the unit pixel P, misalignment and/or overlay failures may be prevented due to alignment accuracy of an exposure apparatus during photolithographic processing. The misalignment and overlay failures may generate different parasitic capacitances of the first and second pixel regions P1 and P2, thereby reducing image quality of the LCD device.

However, according to the present invention, even if the misalignment and/or the overlay failures occur, a sufficient margin may be maintained that prevents variations in the parasitic capacitances in the region of the unit pixel P where the TFT T is formed.

Figure 4A:
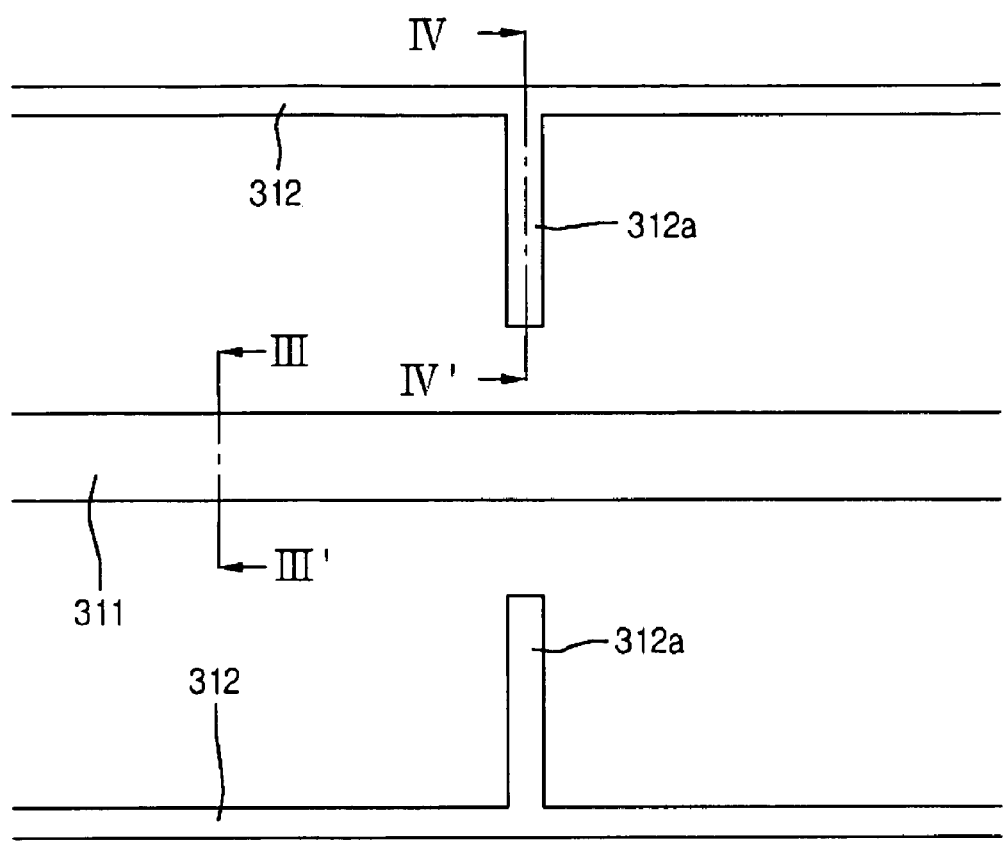
FIGS. 4A to 4F are cross sectional and plan views of an exemplary method of fabricating an IPS mode LCD device according to the present invention.
Figure 4B:
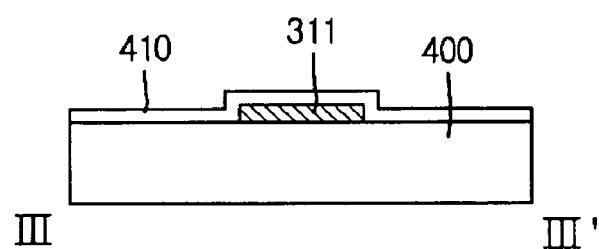
Figure 4B:
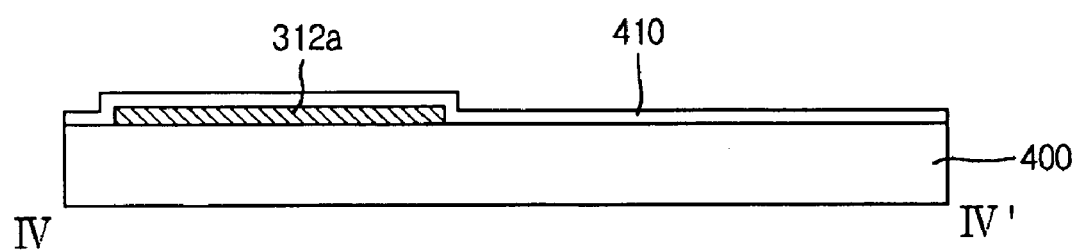
Figure 4C:
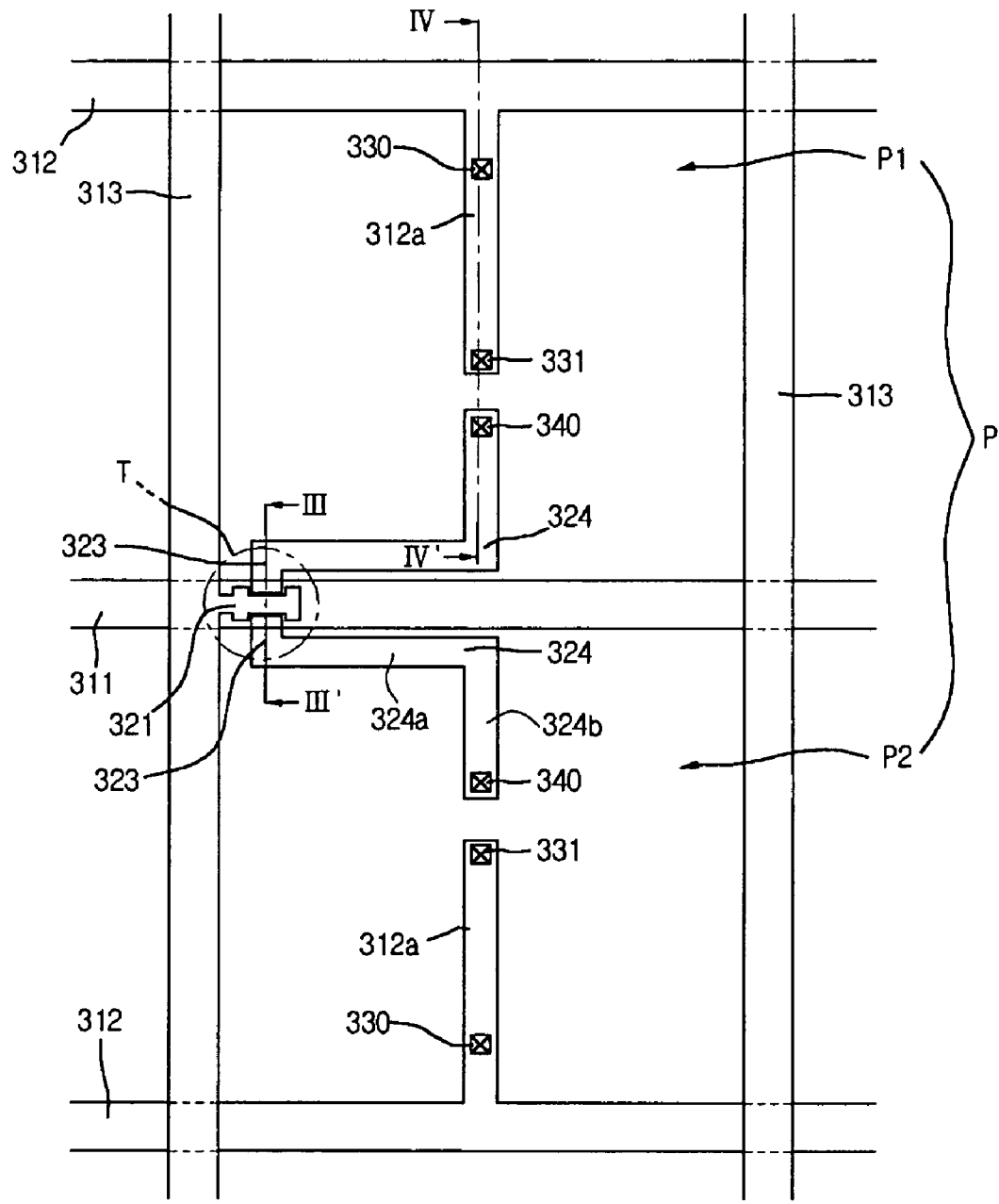
Figure 4D:
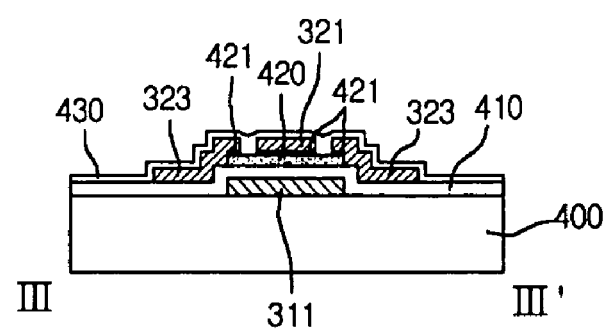
Figure 4D:
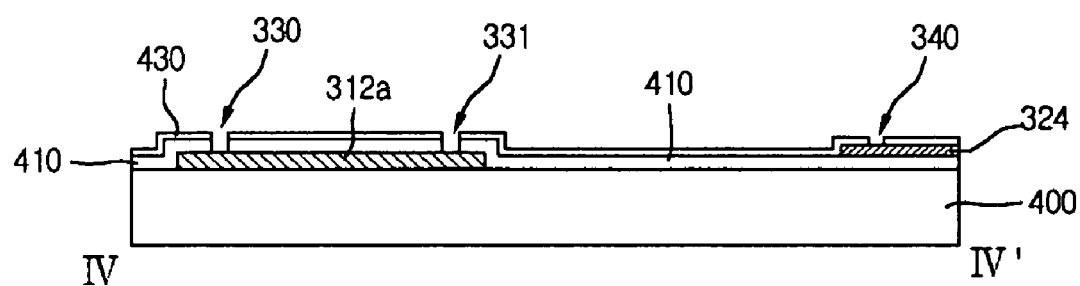
Figure 4E:
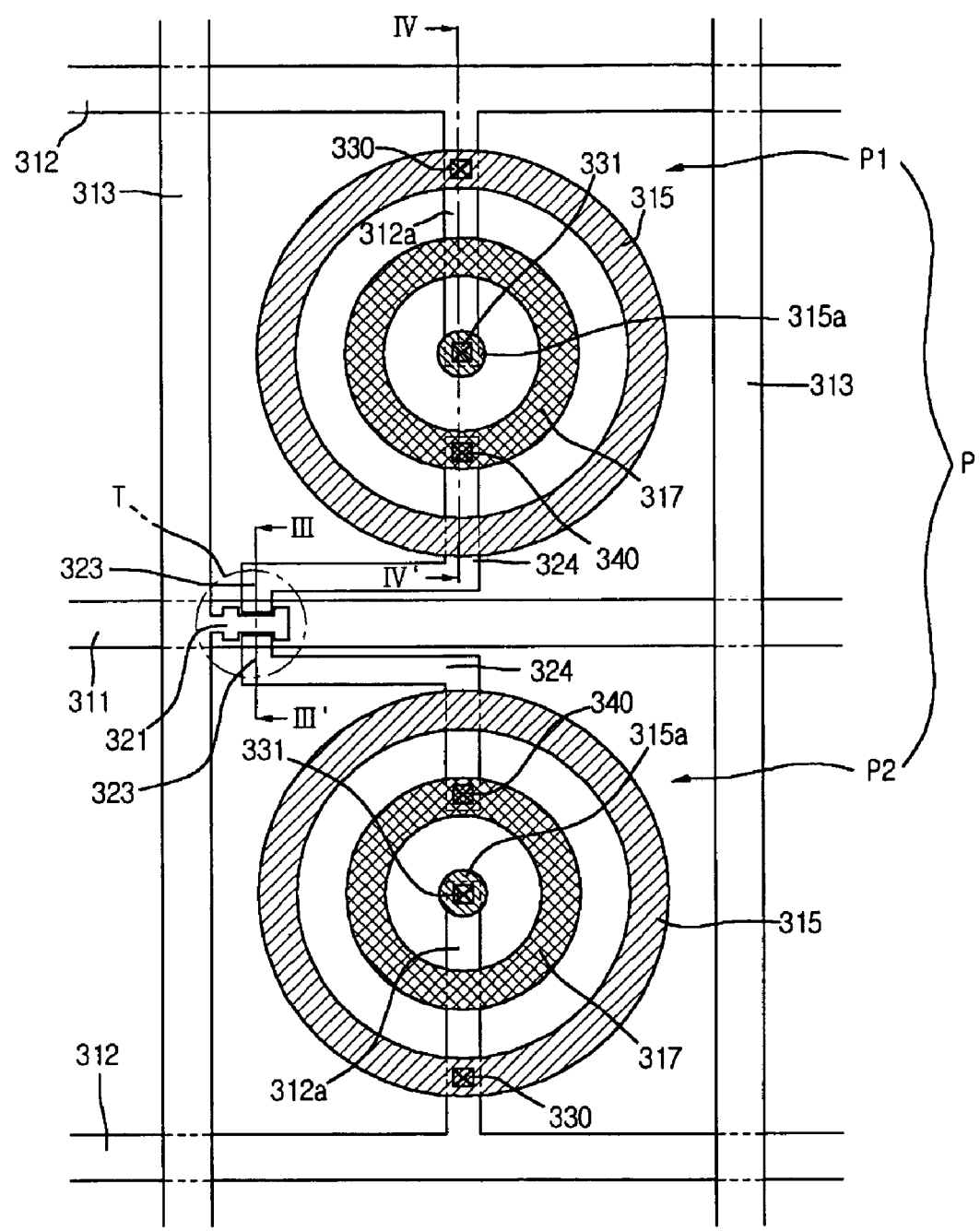
Figure 4F:
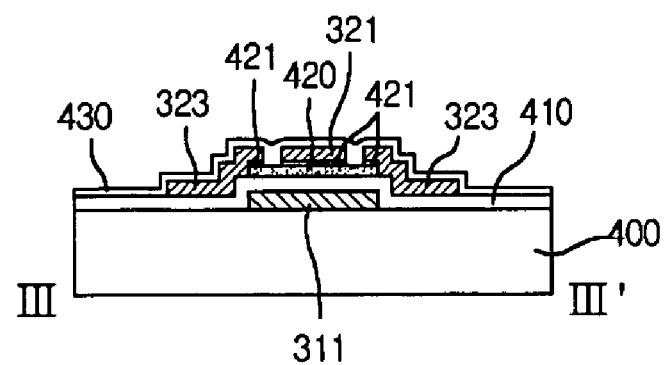
Figure 4F:
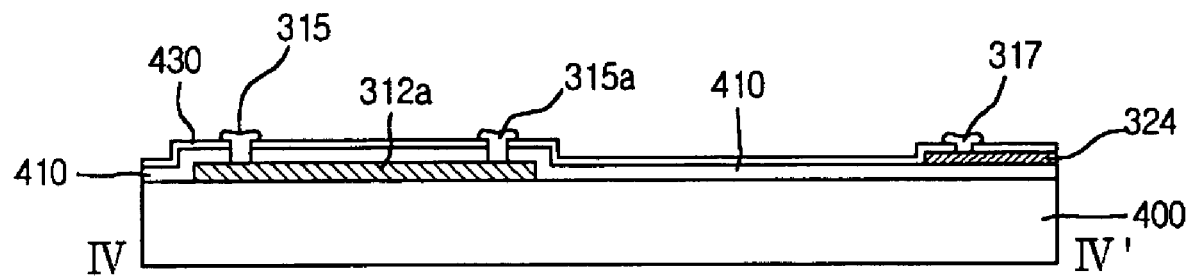

FIGS. 4A to 4F are cross sectional and plan views of an exemplary method of fabricating an IPS mode LCD device according to the present invention. FIGS. 4A, 4C, and 4E are plan views, and FIGS. 4B, 4D, and 4F are cross sectional views along III-III' and IV-IV'. During the exemplary method of fabricating the IPS mode LCD device, each pattern may be formed by transferring a pattern of a mask onto a substrate having a thin film formed thereon using photolithographic processes that may include photoresist coating, align exposure, and developing.

In FIGS. 4A and 4B, a conductive metal film, or films may be deposited onto a substrate 400, and may be patterned to form a gate line 311 and a pair of common electrode lines 312 extending along a first direction. Accordingly, each of the common electrode lines 312 may include a vertical pattern 312a extending from a position of the common electrode line 312 along a second direction perpendicular to the first direction. Then, a gate insulating layer 410 may be formed along an entire surface of the substrate 400 including the gate line 311 by depositing an inorganic insulator film, such as SiNx or $SiO_2$, or an organic insulator film, such as acryl resin or benzocyclobutene (BCB).

In FIGS. 4C and 4D, a pure amorphous silicon (a-Si) and an impurity-doped amorphous silicon (n+a-Si) may be sequentially deposited onto the substrate 400 including the gate insulating layer 410, and may be patterned to form an active layer 420 and an ohmic contact layer 421. Accordingly, as shown in FIG. 4D, a centerline of the active layer 420 may be coincident with centerlines of the source electrode 321 and the gate line 311.

Then, a conductive metal film, or films may be deposited onto the substrate 400 including the ohmic contact layer 421, and may be patterned to form data lines 313, a source electrode 321, and a drain electrode 323. In addition, the drain electrode 323 may have a pixel electrode connection pattern 324. The pixel electrode connection pattern 324 may include a first portion 324a extending from the drain electrode 323 along the first direction, and a second portion 324b extending from the first portion 324a along the second direction and parallel to the drain electrode 323. Accordingly, the second portion 324b of the pixel electrode connection pattern 324 may extend into a central portion of each of first and second pixel regions P1 and P2 at opposing side portions of the gate line 311.

Then, a low dielectric material 430, such as BCB or an acryl resin, may be deposited along an entire surface of the substrate 400 including the drain electrodes 323, the source electrode 321, and the data lines 313, and may be patterned to form a drain contact hole 340 to expose a portion of the second portion 324b of the pixel electrode connection pattern 324. In addition, as shown in FIG. 4D, a first contact hole 330 and a second contact hole 331 may be simultaneously formed through the gate insulating layer 410 and the low dielectric material 430 to expose portions of the vertical pattern 312a of the common electrodes 312. For example, the drain contact hole 340 and the first and second contact holes 330 and 331 may be simultaneously formed during the same step, or steps. In addition, as shown in FIG. 4C, the drain contact hole 340 and the first and second contact holes 330 and 331 of each of the first and second pixel regions P1 and P2 may be formed along a common line extending along the second direction.

In FIG. 4C, a TFT T may be formed at a crossing point of the gate line 311 and the data line 313, and may be positioned at a middle edge region of the unit pixel region P between the first and second pixel regions P1 and P2. Accordingly, by positioning the TFT T at the middle edge portion of the unit pixel region P, misalignment and/or overlay failures may be prevented. The gate line 311 may function as a gate electrode of the TFT T, the source electrode 321 may extend from the data line 313 and formed on the gate line 311, and end portions of each of the pair of drain electrodes 323 may extend from opposing side portions of the source electrode 321 along the second direction. For example, as shown in FIG. 4C, the source electrode 321 may have an "I" shape that extends along a direction of the gate line 311. Thus, each of the drain electrodes 323 may have an end portion that is disposed between short portions of the source electrode 321 that extend along the second direction to be adjacent to a long portion of the source electrode 321 that extends along the first direction.

In FIGS. 4E and 4F, a pair of common electrodes 315 and 315a and a pixel electrode 317 may be concentrically formed within each of the first and second pixel regions P1 and P2 by depositing and patterning a transparent conductive material film, such as indium-tin-oxide (ITO) or indium-zinc-oxide (IZO). Accordingly, each of the pixel electrodes 317 may be electrically connected to one of the drain electrodes 323 through the contact hole 340 formed on the second portion 324b of the pixel electrode connection pattern 324. Similarly, the common electrodes 315 may be formed to laterally enclose the pixel electrode 317, and may be electrically connected to the common electrode line 312 through the first contact hole 330. In addition, the second common electrode 315a may be formed at an interior of the pixel electrode 317, and may be electrically connected to the vertical pattern 312a of the common electrode line 312 via the second contact hole 331.

In FIG. 4F, a first conductive channel may be formed within the active layer 420 between the source electrode 321 and a first one of the pair of drain electrodes 323, and a second conductive channel may be formed within the active layer 420 between the source electrode 321 and a second one of the pair of drain electrodes 323. Accordingly, the TFT T (in FIG. 4E) may function as a dual-channel TFT device.

According to the present invention, since the pixel electrodes 317 and the common electrodes 315 and 315a may have concentric circular shapes, liquid crystal molecules may be radially aligned along third directions from the second common electrode 315a, thereby improving viewing angle characteristics and preventing color shift.

According to the present invention, a TFT region may be positioned at a middle edge region of a unit pixel region, and a pixel electrode and a pair of common electrodes may be formed having concentric circular shapes, thereby maintaining a uniform viewing angle along all directions, preventing color shift, improving uniformity in image quality, and compensating for any misalignment and overlay problems.

It will be apparent to those skilled in the art that various modifications and variations can be made in the an In-Plane Switching (IPS) mode LCD device and a method of fabricating an IPS mode LCD device of the present invention without departing from the spirit or scope of the invention. Thus, it is intended that the present invention covers the modifications and variations of this invention provided they come within the scope of the appended claims and their equivalents.

What is claimed is:

1. An In-Plane Switching mode liquid crystal display device, comprising:

a unit pixel region bordered by first and second common electrode lines extending along a first direction, and bordered by a pair of adjacent data lines extending along a second direction perpendicular to the first direction;

a gate line extending through a middle region of the unit pixel region to define first and second pixel regions, the first and second common electrode lines spaced apart from the gate line by a first distance along the second direction, and the gate line crossing the pair of adjacent data lines at first and second edges of the middle region of the unit pixel region;

a thin film transistor formed at the first edge of the middle region of the unit pixel region, the thin film transistor including first and second drain electrodes, a source electrode, and a gate electrode;

first and second circular pixel electrodes, the first circular pixel electrode disposed within the first pixel region of the unit pixel region and electrically connected to the first drain electrode of the thin film transistor and the second circular pixel electrode disposed within the second pixel region of the unit pixel region and electrically connected to the second drain electrode of the thin film transistor;

first and second circular common electrodes connected to the first common line and disposed within the first pixel region, the first circular common electrode disposed at an interior center region of the first circular pixel electrode and the second circular common electrode disposed at an exterior lateral portion of the first circular pixel electrode; and third and fourth circular common electrodes connected to the second common line and disposed within the second pixel region, the third circular common electrode disposed at an interior center region of the second circular pixel electrode and the fourth circular common electrode disposed at an exterior lateral portion of the second circular pixel electrode.

2. The device according to claim 1, wherein the gate line functions as the gate electrode of the thin film transistor.

3. The device according to claim 2, wherein the source electrode extends along the first direction overlying the gate line.

4. The device according to claim 1, wherein the first circular pixel electrode and the first and second circular common electrodes are mutually concentric, and the second circular pixel electrode and the third and fourth circular common electrodes are mutually concentric.

5. The device according to claim 1, wherein the first drain electrode includes a first portion that extends into the first pixel region and the second drain electrode includes a second portion that extends into the second pixel region.

6. The device according to claim 5, wherein the first circular pixel electrode electrically contacts the first portion of the first drain electrode through a first contact hole, and the second circular pixel electrode electrically contacts the second portion of the second drain electrode through a second contact hole.

7. The device according to claim 1, wherein the thin film transistor further comprises an active layer disposed between the source electrode and the gate electrode.

8. The device according to claim 7, wherein a first conductive channel is formed within the active layer between the source electrode and the first drain electrode, and a second conductive channel is formed within the active layer between the source electrode and the second drain electrode.

9. The device according to claim 8, wherein the thin film transistor further comprises an ohmic contact layer disposed between the active layer and the source electrode and the pair of drain electrodes.

10. The device according to claim 8, wherein a centerline of the source electrode is coincident with centerlines of the active layer and the gate electrode.

11. The device according to claim 1, wherein the first and second circular pixel electrodes are electrically connected to the thin film transistor through the first and second drain electrodes.

12. A method of fabricating an In-Plane Switching mode liquid crystal display device, comprising:
    forming a gate line and first and second common electrode lines onto a substrate extending along a first direction, each of the common electrode lines having a vertical pattern extending along a second direction perpendicular to the first direction;
    forming a gate insulating layer on the substrate including the gate line and the common electrode lines;
    forming a source electrode, first and second drain electrodes and a data line on the substrate, the source electrode formed along the gate line, the data line crossing the gate line along a second direction perpendicular to the first direction to define a unit pixel region, the unit pixel region defined as first and second pixel regions by the gate line, a thin film transistor including a portion of the gate line, the source electrode, the first and second drain electrodes and formed along the gate line and at crossing region of the gate line and the data line;
    forming a passivation layer on the substrate including the data line; and
    forming a first circular pixel electrode and first and second circular common electrodes within the first pixel region and forming a second circular pixel electrode and third and fourth circular common electrodes Within the second pixel region, the first and second circular common electrodes formed at an interior and exterior regions of the first circular pixel electrode, and the third and fourth circular common electrodes formed at an interior and exterior regions of the second circular pixel electrode,
    wherein the first circular pixel electrode is electrically connected to the first drain electrode of the thin film transistor, and the second circular pixel electrode is electrically connected to the second drain electrode of the thin film transistor.

13. The method according to claim 12, wherein the first circular pixel electrode and the first and second circular common electrodes are mutually concentric, and the second circular pixel electrode and the third and fourth circular common electrodes are mutually concentric.

14. The method according to claim 12, wherein forming the thin film transistor comprises:
    sequentially depositing pure amorphous silicon and impurity-doped amorphous silicon onto the substrate including the gate insulating film; and
    patterning the pure amorphous silicon and impurity-doped amorphous silicon to form an active layer and an ohmic contact layer, respectively.

15. The method according to claim 12, wherein the first drain electrode includes a first portion that extends into the first pixel region and the second drain electrode includes a second portion that extends into the second pixel region.

16. The method according to claim 14, wherein a first conductive channel is formed within the active layer between the source electrode and the first drain electrode, and a second conductive channel is formed within the active layer between the source electrode and the second drain electrode.

17. The method according to claim 16, wherein a centerline of the source electrode is coincident with centerlines of the active layer and the gate line.

18. The method according to claim 12, wherein the vertical pattern of the first common electrode line extends toward the gate line along the second direction into the first pixel region, and the vertical pattern of the second common electrode line extends toward the gate line along the second direction into the second pixel region.

19. The method according to claim 18, wherein the first and second common electrodes electrically contact the vertical pattern of the first common electrode line via a first plurality of contact holes formed in the gate insulating film and the passivation layer, and the third and fourth common electrodes electrically contact the vertical pattern of the second common electrode line via a second plurality of holes formed in the gate insulating film and the passivation layer.

20. A liquid crystal display device, comprising:
    first and second common electrode lines on a substrate extending along a first direction;
    a pair of adjacent data lines extending along a second direction perpendicular to the first direction to cross the first and second common electrode lines to define a unit pixel region;
    a gate line extending between the first and second common electrode lines along the first direction and crossing the pair of adjacent data lines, the first and second common electrode lines spaced apart from the gate line by a first distance along the second direction defining a first pixel region and a second pixel region of the unit pixel region; and a thin film transistor formed at the crossing of the gate line and one of the pair of adjacent data lines, the thin film transistor including first and second drain electrodes, a source electrode, and a portion of the gate line, wherein the first pixel region includes a first circular pixel electrode and first and second circular common electrodes each disposed at an interior and exterior regions of the first circular pixel electrode, and the second pixel region includes a second circular pixel electrode and third and fourth circular common electrodes each disposed at an interior and exterior regions of the second circular pixel electrode, wherein the first circular pixel electrode is electrically connected to the first drain electrode of the thin film transistor, and the second circular pixel electrode is electrically connected to the second drain electrode of the thin film transistor.

21. The device according to claim 20, wherein the gate line functions as the gate electrode of the thin film transistor.

22. The device according to claim 21, wherein the source electrode extends along the first direction overlying the gate line.

23. The device according to claim 20, wherein the first drain electrode includes a first portion that extends into the first pixel region and the second drain electrode includes a second portion that extends into the second pixel region.

* * * * *